United States Patent [19]

Hendriks

[11] Patent Number: 5,042,573
[45] Date of Patent: Aug. 27, 1991

[54] SCRAPED SURFACE HEAT EXCHANGER

[75] Inventor: Albertus G. Hendriks, Vlaardingen, Netherlands

[73] Assignee: Van den Bergh Foods Co., Division of Conopco, Inc., Lisle, Ill.

[21] Appl. No.: 521,769

[22] Filed: May 10, 1990

[30] Foreign Application Priority Data

May 24, 1989 [NL] Netherlands ............... 8901297

[51] Int. Cl.⁵ .................................. F28F 5/04
[52] U.S. Cl. ........................... 165/94; 62/354; 366/309
[58] Field of Search ............... 165/94; 62/354; 366/149, 309, 312

[56] References Cited

U.S. PATENT DOCUMENTS

| 1,949,374 | 2/1934 | Johnson | 165/94 X |
| 2,064,131 | 12/1936 | Tuscan et al. | 366/149 |
| 2,188,551 | 1/1940 | Kaltenbach et al. | 366/313 |
| 3,187,802 | 6/1965 | Hickey | 165/2 |
| 3,255,815 | 6/1966 | Smith | 165/94 |
| 4,126,177 | 11/1978 | Smith et al. | 165/91 |
| 4,156,617 | 5/1979 | Deubel et al. | 165/94 X |
| 4,279,295 | 7/1981 | Duckworth et al. | 165/94 |

FOREIGN PATENT DOCUMENTS

| 52240 | 10/1943 | France | 165/94 |
| 2394777 | 2/1979 | France | 165/94 |
| 276436 | 10/1964 | Netherlands | 165/94 |
| 468812 | 7/1937 | United Kingdom | 165/94 |
| 1121091 | 1/1962 | United Kingdom | 165/94 |

Primary Examiner—Allen J. Flanigan
Attorney, Agent, or Firm—A. Kate Huffman

[57] ABSTRACT

Scraped surface heat exchanger, the shape of the chamber thereof and the positioning and direction of feed and discharge conduits opening into said chamber being such that, on feeding a liquid through these conduits and the chamber, the flow of said liquid will cover the entire chamber.

8 Claims, 2 Drawing Sheets

SCRAPED SURFACE HEAT EXCHANGER

BACKGROUND OF THE INVENTION

The invention relates to a scraped surface heat exchanger having a cylindrical chamber surrounded by heat-exchanging means, at least one feed conduit and at least one discharge conduit for feeding and discharging a product to be treated in that heat exchanger being connected to said chamber, and a rotor provided with scraper elements being rotatably arranged in said chamber. A heat exchanger of this type is known from U.S. Pat. No. 2 188 551.

For reasons of increasing hygienic standards and the cleanability of food processing equipment, there is a continuing need for improved heat exchangers of the above type, and in particular equipment suited for in-line cleaning, whereby the frequency of the equipment having to be taken apart may be reduced.

It is an aim of the invention to improve the hygiene and the cleanability of the above type of heat exchangers, thereby requiring them to be taken apart at less frequent intervals.

Other objects and advantages of the invention will become apparent as the specification proceeds.

SUMMARY OF THE INVENTION

With the above objects in view, the invention provides a heat exchanger as described hereinbefore, wherein the shape of the chamber is designed such that, and the feed and discharge conduits are arranged such that, on feeding a liquid through said conduits and the chamber, this fluid will be guided in a flow covering the entire chamber. To put it in other words, this means that no dead spots remain if the fluid is fed through the heat exchanger.

In an embodiment giving good results in practice, the feed and discharge conduits are arranged such that they put the fluid in a helical flow in the chamber. To that end, these conduits have in particular a tangentially directed component with respect to the cylindrical chamber.

It is advisable to give the flow a certain pitch, for which, in a preferred embodiment, said conduits are arranged at a sharp angle with respect to the axis of the chamber. Said angle is preferably from 25° to 70°, and in particular from 40° to 50°.

To prevent the disturbance of the flow as much as possible, it is preferable that any joints opening into the chamber, as well as any seals, do not give rise to discontinuity in the internal surface of the chamber.

For reliably flushing the chamber with cleaning liquid and removing cleaning liquid and product to be treated as completely as possible, it is advisable that each of the feed and discharge conduits should open into one of the end plates at diametrically opposite positions in a vertical plane and adjacent to the cylindrical wall of the chamber.

For testing the tightness of hollow parts, these parts are preferably provided with a conduit leading to the outside of the heat exchanger and communicating, with the cavity inside the part so that the conduit may be closed if required. With this provision, the tightness of said part and the absence or presence of pores, cracks and similar defects may be tested.

BRIEF DESCRIPTION OF THE DRAWINGS

The invention will be illustrated in the annexed drawings, which is given by way of example only. In the drawings

DETAILED DESCRIPTION OF PREFERRED EMBODIMENTS

Figure 2:
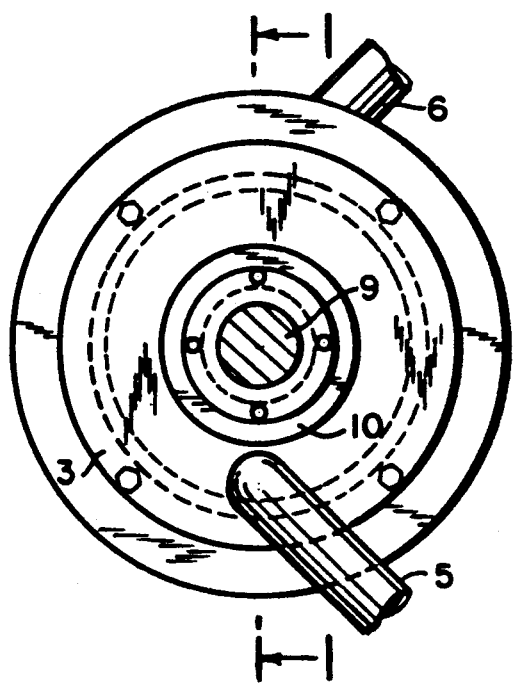
FIG. 2 is a front view from the feed end.
Figure 3:
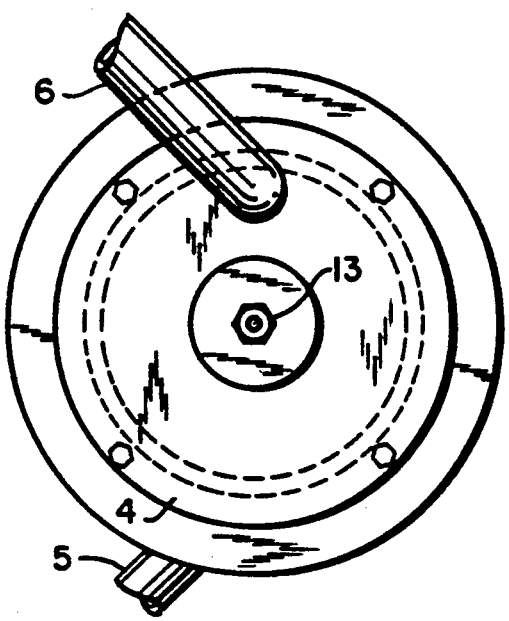
FIG. 3 is a front view from the discharge end.

In the drawings a preferred embodiment of a heat exchanger according to the invention is shown, which heat exchanger is suited, for instance, for manufacturing ice cream. This heat exchanger is provided with an elongate cylindrical chamber 1, mainly confined by a cylindrical wall 2 and two end plates 3,4. One end wall 3 is provided with a feed conduit 5 and the other 4 with a discharge conduit 6 for feeding and discharging, respectively, a product to be treated in the chamber 1. When seen in side view (see FIG. 1), these conduits are at a sharp angle with respect to the axis of the chamber and, when seen in axial view (see FIG. 2 and 3), these conduits are tangentially arranged in the same rotational sense. The feed conduit 5 is arranged at the lowermost and the discharge conduit 6 at the uppermost point of the chamber, in order that any air may escape during use of the heat exchanger while, after shutting down, all liquid will drain off. An additional result is that the entire chamber may be flushed with a liquid and that no dead spots ar formed.

Figure 1:
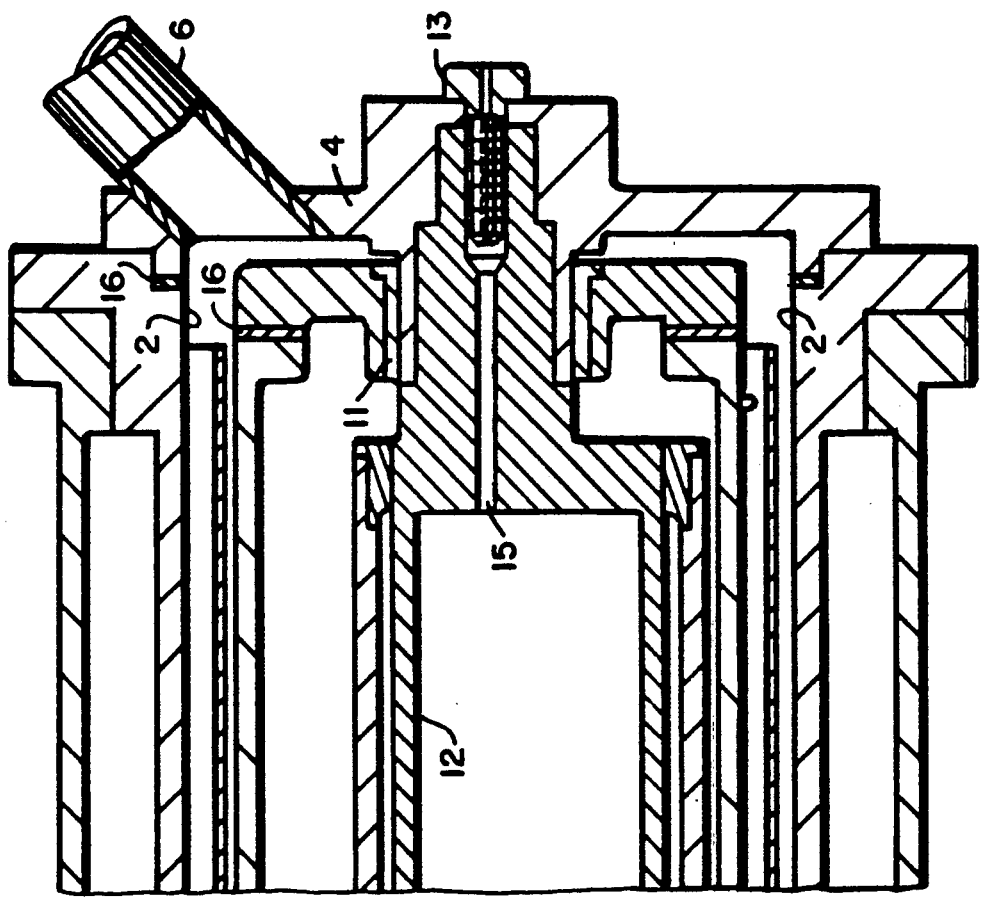
FIG. 1 is a schematic longitudinal section along the line I—I in FIG. 2 showing a heat exchanger according to the invention.
Figure 4:
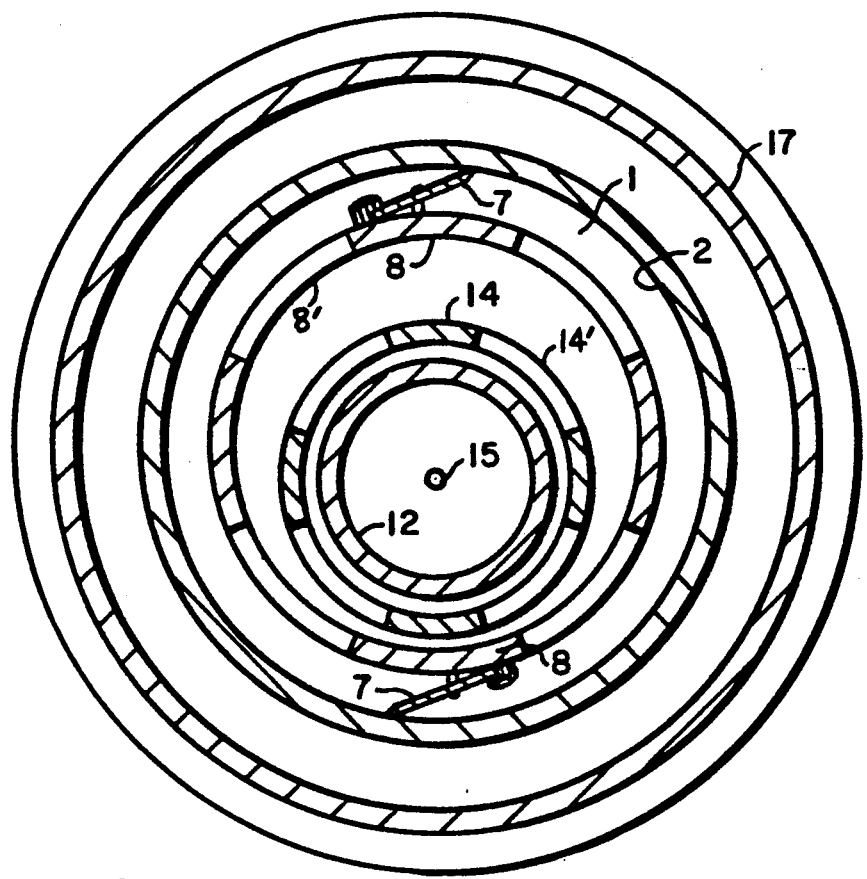
FIG. 4 is a cross-sectional view along the line IV—IV in FIG. 1.

A hollow cylindrical rotor 8, provided with scraper blades 7 bearing against the inner wall of the chamber 1, is rotatably arranged in said chamber. In a preferred embodiment, the scraper blades 7 are attached to the rotor 8 as shown in FIGS. 1 and 4. The blades 7 extend axially in the chamber 1 as illustrated in FIG. 1, and as is known in the art to optimize the efficiency of the heat exchanger. The rotor 8 is, at one end, supported by the driving shaft 9, which is rotatably supported in a bearing 10 arranged in the end wall 3. At the other end, the rotor 8 is rotatably supported by a fixed hollow shaft 12 by the intermediate of a suitable bearing 11.

In a preferred embodiment shown in FIG. 4, the rotor 8 is provided with a plurality of gaps 8' in the wall of the rotor 8. These gaps 8' may be spaced in the rotor wall as shown in FIG. 4 and as is conventionally known in the art. It may be appreciated that the rotor wall may be constructed without any gaps.

The hollow shaft 12 is fixed to the end wall 4 by means of a bolt 13 having an axial bore, which shaft also supports the eccentrically rotatable beater 14, having longitudinal slits arranged in a usual manner, which beater may also be static. By means of the bore 15 in the bolt 13, pressure-testing gear may be connected for testing the tightness of the hollow shaft 12.

In the drawing it is clearly shown that surfaces which are exposed to the product to be treated, are connected through rounded corners and are devoid of grooves and ribs and which generally have a smooth shape. Joints between different parts, such as between the cylindrical wall 2 and the end wall 3 are designed such that no discontinuity in the total surface results. Any seal 16 arranged in this joint should conform to this requirement, too.

The heat exchanger is, in a usual manner, provided with a jacket 17 for a refrigerant or heating medium.

What is claimed is:

1. A scraped surface heat exchanger having a cylindrical chamber surrounded by heat-exchanging means, at least one feed conduit means and at least one discharge conduit means for feeding and discharging a product to be treated in the heat exchanging means and a rotor provided with scraper elements rotatably arranged in said chamber, wherein the improvement comprises:

arranging the feed conduit means and the discharge conduit means tangentially relative to the cylindrical chamber whereby fluid passing through the chamber from the feed conduit means and out the discharge conduit means is rotated to form a helical flow in the chamber and the helical flow covers the entire chamber.

2. The heat exchanger according to claim 1, wherein each of the heat and discharge conduit means have a tangentially directed component with respect to the cylindrical chamber.

3. The heat exchanger according to claim 1 wherein each of the feed and discharge conduits are arranged at a sharp angle with respect to the axis of the chamber.

4. The heat exchanger according to claim 3 wherein the sharp angle is from 25° to 70° with respect to the axis of the chamber.

5. The heat exchanger according to claim 4, wherein the sharp angle is from 40° to 50° with respect to the axis of the chamber.

6. The heat exchanger according to claim 1 further comprising: one or more joint means used to pass the fluid into and out of the chamber through the feed conduit means and the discharge conduit means, the joint means opening into the chamber without giving rise to discontinuity in an internal surface of the chamber.

7. The heat exchanger according to claim 6 wherein the joint means comprises seal means for sealing the joint in the chamber without giving rise to discontinuity in the internal surface of the chamber.

8. The heat exchanger according to claim 1, further comprising a first end plate connected to one end of the chamber and a second end plate connected to an opposite end of the chamber, so that the conduit means are diametrically opposed in a vertical plane and the feed conduit means and the discharge conduit means are adjacent to a cylindrical wall of the chamber.

* * * * *